United States Patent [19]
DeMoss

[11] Patent Number: 6,138,125
[45] Date of Patent: Oct. 24, 2000

[54] BLOCK CODING METHOD AND SYSTEM FOR FAILURE RECOVERY IN DISK ARRAYS

[75] Inventor: Robert A. DeMoss, Wichita, Kans.

[73] Assignee: LSI Logic Corporation, Milpitas, Calif.

[21] Appl. No.: 09/052,894

[22] Filed: Mar. 31, 1998

[51] Int. Cl.[7] .................................................. G06F 17/30
[52] U.S. Cl. .............................. 707/202; 707/205; 714/6; 714/7
[58] Field of Search ...................................... 707/202, 205, 707/103, 102, 104; 709/214; 714/7, 767, 6, 802, 770, 5; 711/111, 114

[56] References Cited

U.S. PATENT DOCUMENTS

| | | | |
|---|---|---|---|
| 5,271,012 | 12/1993 | Blaum et al. | 714/6 |
| 5,373,513 | 12/1994 | Howe et al. | 714/775 |
| 5,506,977 | 4/1996 | Jones | 711/155 |
| 5,579,475 | 11/1996 | Blaum et al. | 714/7 |
| 5,737,743 | 4/1998 | Ooe et al. | 711/112 |
| 5,742,752 | 4/1998 | DeKoning | 714/6 |
| 5,867,640 | 2/1999 | Aguilar et al. | 714/6 |
| 5,956,734 | 9/1999 | Schmuck et al. | 707/205 |

*Primary Examiner*—Wayne Amsbury
*Assistant Examiner*—Thu-Thao Havan

[57] ABSTRACT

A method, system, and data structure for encoding a block of data with redundancy information and for correction of erasure type errors in the block using the redundancy data. In particular, the invention is particularly applicable to disk array storage subsystems which are capable of recovering from total or partial failures of one or two disks in the disk array. Still more specifically, the invention is applicable to RAID level 6 storage devices. A given data block of data is translated into a code block of $n^2$ elements including $2n$ XOR parity elements for redundancy. Each code block is manipulated as a square matrix, of $n^2$ elements with parity elements along the major diagonals of the matrix and data elements in the remainder of the matrix. Each parity element is a dependent variable whose value is the XOR sum of the $(n-2)$ data elements in a minor diagonal which intersects it. If the elements in any one or two columns or one or two rows are erased, their values can be generated from the other elements in the matrix. The invention therefore allows for recovery from data loss resulting from complete failure of any one or two disks in the disk array. Further, since the invention recovers all erased elements in any one or two rows, it allows recovery from data loss resulting from correlated partial failure of all disks in the disk array. Still further, the invention allows recovery from many uncorrelated failure patterns in the storage domain of disk drives in a disk array.

37 Claims, 4 Drawing Sheets

BLOCK CODING METHOD AND SYSTEM FOR FAILURE RECOVERY IN DISK ARRAYS

BACKGROUND OF THE INVENTION

1. Field of the Invention

The invention relates to error correction coding and in particular to a method and system of block coding particularly useful in a RAID 6 disk array storage system where the method and system are optimal as measured in terms of overhead storage requirements and are computationally simple.

2. Description of Related Art

As users have demanded increased reliability and capacity for computer storage subsystems, disk array storage systems have evolved as a solution to both needs. Disk array storage subsystems use multiple disk drives and distribute the data to be stored over the multiple disk drives. Distributing the data over multiple drives is a process commonly referred to as "striping." Striping the data over the disk drives enhances performance as compared to a single disk drive in that smaller amounts of data are written to or read from multiple disk drives in parallel. The total time to complete a particular read or write operation is therefore reduced because multiple disk drives perform the operation in parallel.

However, multiplying the number of disk drives used to store data increases the probability of a failure causing loss of data. The mean time between failure of multiple disk drives storing data is less than the mean time between failure of a single disk drive storing the same data. Storage arrays therefore provide for additional (overhead) storage to provide redundancy information used to recover data lost due to failure of other disk drives. Such loss of data is often referred to as "erasure" of the data. The redundancy information is used in general for two purposes. First, the redundancy information is used to restore data to a failed disk drive after it is repaired or replaced. Second, the redundancy information is used to allow continued operation of the storage array system while the failed disk drive is undergoing repair or replacement. In other words, lost data on the failed disk drive may be regenerated in real time by the storage array system using the redundancy information.

Typically, a storage controller device is used to perform requisite management of the array storage and redundancy generation and checking. The storage array is made to appear to the attached computer systems to be a single, large capacity, highly reliable disk drive. The data to be stored on the array is "mapped" in that the storage capacity of the array may be addressed as a large linear vector of blocks addressed by a logical block address. The storage controller receives requests to manipulate data from an attached computing system which identifies affected blocks using the logical block addresses. The storage controller maps or translates such information into lower level I/O operations which direct the read and write operations to appropriate physical locations on appropriate disk drives of the array. In addition, the storage controller performs all requisite generation and checking of the redundancy information associated with the affected data. For example, where the computer system writes new or updated data to the storage array, the storage controller assures that affected redundancy information is also updated. Or for example, where the computer system requests a read of data and a disk drive in the array has failed, the requested data is retrieved from the remaining operational disk drives and any missing data lost due to failure of a disk drive is regenerated using the redundancy information. The storage controller therefore performs storage management so as to make the data distribution over the disk array and the redundancy information generation and use transparent to attached computer systems.

RAID management is a storage management technique commonly used in present storage subsystems. RAID is an acronym for Redundant Array of Inexpensive Disks. The 1987 publication by David A. Patterson, et al., from University of California at Berkeley entitled *A Case for Redundant Arrays of Inexpensive Disks* (*RAID*), reviews the fundamental concepts of RAID technology. There are several "levels" of standard geometries defined in the Patterson publication. The simplest array which provides for redundancy information, a RAID level 1 system, comprises one or more disks for storing data and an equal number of additional "mirror" disks for storing copies of the information written to the data disks. Other RAID levels, identified as RAID levels 2–4, segment the data into portions for storage across several data disks and use Exclusive-OR (XOR) parity as redundancy information to enhance the reliability of the array. An additional disk is used to store the XOR parity information. RAID level 5 also distributes the parity information over the entire array.

RAID level 5, for example, imposes a penalty on write operations in that an update to the data in the storage array requires an additional operation to update the associated parity block. RAID storage controllers provide a number of techniques to lessen the impact of this so called write penalty.

XOR parity as provided in RAID 2–5 guards against the loss of data from failure of a single disk drive in the array. When a single disk drive fails, the data lost on that disk drive is reconstructed by performing an XOR of the related blocks of the data in a corresponding stripe on the remaining operational disk drives. As noted above, the lost data may be reconstructed in real time to continue operation of the array despite the loss of a single disk and may be reconstructed at the time of replacement of the failed disk drive with a replacement or repaired disk.

RAID level 6 is a further development wherein a second drive having redundancy information is used to guard against failure of two disk drives in the storage array. The second redundancy scheme is independent of the first to assure recovery of a two disk failure. The write penalty noted above is similar in RAID level 6 except greater in magnitude (twice the effect). As with RAID level 5 noted above, most RAID level 6 systems utilize techniques within the storage controller to mitigate the affects of the write penalty. As with RAID 5, though the controller may mitigate the effects of the write penalty, such mitigating techniques tend merely to defer the timing of the effects of the write penalty. None-the-less, the write penalty remains an important factor in overall performance of an array storage system.

A number of techniques have been applied to implement RAID level 6 by providing two independent redundancy information schemes. Each presently known approach has certain strengths and offsetting weaknesses.

U.S. Pat. No. 5,579,475 to Blaum et al. discloses a method for encoding and rebuilding data contents of up two unavailable disks in a disk array (see also Blaum et al., "EVENODD: An Optimal Scheme for Tolerating Double Disk Failures in RAID Architectures", IEEE Pub. No 1053-6997/94). This method, referred to as "EVENODD" coding, utilizes only XOR operations, and requires fewer and simpler computations than previous schemes. The EVENODD method (as explained below), however, is not optimally efficient for applications involving a high frequency of small write operations. Such applications often require that more than 2 XOR parity blocks be updated in response to the update of a small portion of data. In other words, the EVENODD method may impose a significant performance penalty (write penalty on applications which frequently perform small write operations).

Another previously known method for implementing RAID level 6 is based on Reed-Solomon coding (often referred to as Reed-Solomon PQ) requires finite field computations. Such finite field computations are substantially more complex than simple XOR parity computations. In view of the computational complexity, most RAID 6 systems using Reed-Solomon PQ encoding have special custom electronic circuits (ASICs) to assist in the requisite computations for redundancy. Use of such special ASIC devices adds complexity to the storage controller and also precludes use of existing controller devices which are devoid of such Reed-Solomon computational assist circuits. In other words, existing RAID storage subsystems (i.e., RAID level 5 systems) would not be capable of implementing RAID level 6 due to the lack of Reed-Solomon computational assistance.

Still another technique referred to as 2-D Parity (as in two dimensional parity) applies simple XOR parity computations to both the rows of an array and to the columns of the array. The disk array in 2-D Parity encoding techniques is a two dimensional array of disk drives consisting of R×C data disks and R+C redundancy disks. The R×C data disks are arranged in a rectangular matrix of R rows and C columns. For each of the R rows of data disks there is a corresponding redundancy disk storing redundancy information (e.g., XOR parity information). Likewise, for each of the C columns, there is a corresponding redundancy disk storing redundancy information (e.g., XOR parity information). This technique provides for computational simplicity in that it uses only XOR computations. However, the 2-D Parity technique does not achieve optimal results in terms of storage capacity required for storage of redundancy information. Rather, the storage capacity (overhead storage capacity) required for 2-D Parity is R+C drives which exceeds that of other techniques. Further, the 2-D Parity encoding technique provides less protection for partial disk failures as compared to other techniques.

It can therefore be seen that existing methods for error recovery in RAID level 6 systems, in particular, present problems in a number of areas. It is therefore desirable to provide an improved method which requires minimal storage capacity for storage of redundancy information, is computationally simple using only XOR computations, and minimizes the write penalty suffered in applications which frequently perform small write operations.

SUMMARY OF THE INVENTION

The present invention solves the above and other problems, thereby advancing the state of the useful arts, by providing a novel block coding method particularly useful for implementing RAID level 6 in a disk array. In the preferred embodiment, data is encoded onto an array of n data storage devices as an n×n two dimensional matrix of blocks, a "code block" (n disk drives wide with n blocks on each drive) where (n+1) is a prime number. $(n^2-2n)$ blocks within the $n^2$ blocks in the code block are data blocks in the matrix while 2n of the blocks are XOR parity blocks. Half the parity blocks (n parity blocks) are computed for a corresponding set of data blocks geometrically described as "upward" diagonal sequences. The other half of the parity blocks are computed, independently of the first half, for a corresponding set of data blocks in "downward" diagonal sequences. The data blocks are stored in a configuration in which every location in the matrix, except those locations along each major diagonal, contains one of the data elements. The two sets of independently computed parity blocks are stored along the two major diagonals. Each minor diagonal of the matrix is a upward or downward diagonal which wraps around the matrix as a sequence of (n−1) data blocks corresponding to one of the parity blocks.

A data block thus encoded is recovered, after being erased (e.g., lost due to disk failure), in the following manner. A first erased element in the matrix is located. Next, all members of both of the wrapped minor diagonal(s) which intersect(s) the erased element are located. It is then determined whether either of the members of the wrapped minor diagonal(s) contain(s) other erased elements. If no other erased elements are found for a minor diagonal, then the erased element is recovered by calculating an XOR sum of all of the (n−2) unerased elements in the one minor diagonal having no other erased elements. The above procedure is repeated until all erased elements have been recovered. The recovered matrix is then used to restore data on a replacement or repaired disk in accordance with disk array storage management methods. Alternatively, the recovered matrix may be used as the means which provides missing (erased) data back to an attached system which requested a read operation while the storage array was operating in a degraded mode due to failure of disk drives within.

Since every data block lies within each of two minor diagonals of the n×n matrix of blocks, and each minor diagonal is associated with a parity block in a corresponding major diagonal, the parity scheme of the present invention guards against loss of data for up to two drive failures. Further, the method and system of the present invention provides such protection using the computationally relatively simple XOR parity computations. The present method tolerates double disk failures without data loss, and offers significant advantages over other methods such as Reed-Solomon and EVENODD coding methods. Lastly, the present invention distributes the data and parity evenly over the array of disks and is as good or better than previous known techniques with respect to small write penalty.

It is, therefore, an object of the present invention to provide a method for implementing an erasure recovery system for an array of data storage devices.

It is an additional object to require minimal storage redundancy in all array configurations.

It is a further object to employ only simple XOR operations in calculating parity for all data stored in an array of data storage devices.

It is an additional object to provide a minimal parity element update penalty for small write operations.

It is a still further object to provide an erasure recovery method which tolerates partial failure of all disk drives in an array group in the same region of disk space.

It is an additional object of the present invention to provide a method which automatically distributes parity elements evenly across all disks in an array group to thus minimize parity drive bottlenecks.

The above and other objects, aspects, features, and advantages of the present invention will become apparent from the following description and the attached drawings.

DETAILED DESCRIPTION OF THE PREFERRED EMBODIMENTS

Figure 1:
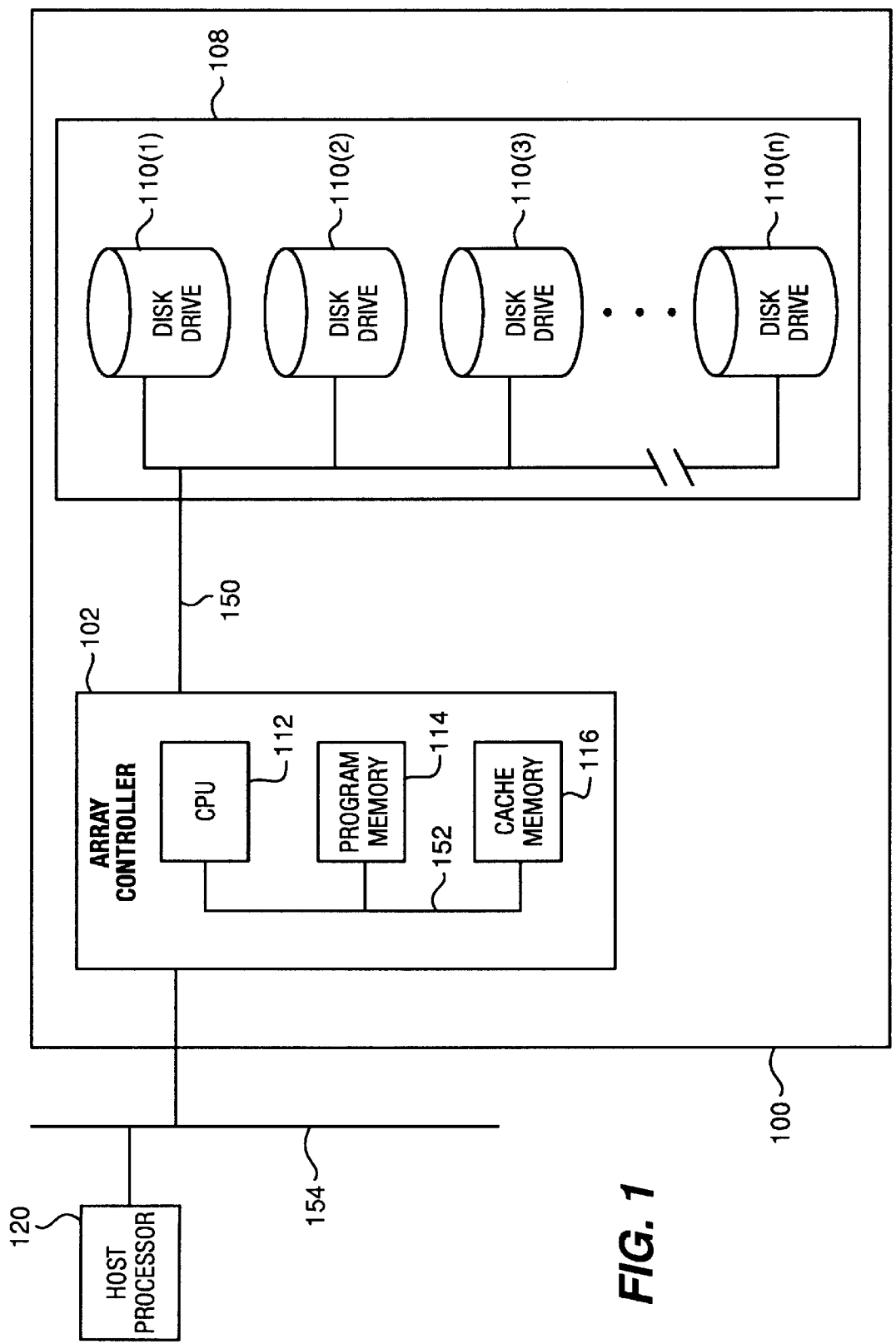
FIG. 1 is a block diagram of a typical RAID storage system in which the methods and structures of the present invention are advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

A RAID level 6 disk array provides a illustrative scenario for describing the method of the present invention. It should be noted, however, that the specific methods set forth in the present description of this invention are not only applicable to extensions of the specific embodiments set forth herein, but are also applicable to any method or system that uses multiple mass storage devices, e.g., tape drives, to store data.

TYPICAL RAID SYSTEM

FIG. 1 is a block diagram of a typical RAID storage system 100 in which the methods of the present invention may be applied. RAID storage system 100 includes RAID array controller 102 which is in turn connected to disk array 108 via bus (or buses) 150 and to host processor 120 via bus 154. Disk array 108 is comprised of a plurality of disk drives 110(1) through 110(n), hereinafter referred to simply as "disks" 110(*). The "*" character is a "wild card" which is used in this document to reference any one of a group of similar members. Interface bus 150 between array controller 102 and disk array 108 may be any of several industry standard interface buses including SCSI, IDE, EIDE, IPI, Fibre Channel, SSA, PCI, etc. Circuits (not shown) within controller 102 appropriate to controlling bus 150 are well known to those of ordinary skill in the art. Interface bus 154 between array controller 102 and host processor 120 may be any of several standard industry interface buses including SCSI, Ethernet (LAN), Token Ring (LAN), Fibre Channel, etc. Circuits (not shown) within controller 102 appropriate to controlling bus 154 are also well known to those of ordinary skill in the art.

The various RAID levels are distinguished by the manner in which array controller 102 logically subdivides or partitions the disks 110(*) in disk array 108. RAID Level 6 systems provide protection from failure of two disks in an array. RAID level 6 requires two independent redundancy computations be used for each portion of protected data. Two such independent methods assure recovery of data even in the event of failure of two disk drives 110(*) in disk array 108.

In the preferred embodiment of the present invention, array controller 102 performs the task of generating parity information and mapping this parity information along with data from host processor 120 to the disks 110(*) in disk array 108. Those skilled in the art will recognize that other exemplary embodiment are possible where, for example, the parity generation and data/parity mapping could be performed in the host processor, with a commensurate penalty of processor resources. FIG. 1 therefore represents one such embodiment but is intended to suggest other such equivalent embodiments.

As shown in FIG. 1, RAID array controller 102 includes CPU 112, program memory 114 (e.g., ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices.

It should be noted that the methods of the present invention may be applied to an array of storage devices such as magnetic tape drives in addition to disk drives as in RAID system 100 shown in FIG. 1.

One of ordinary skill in the art will readily recognize that the block diagram of FIG. 1 is intended only as an exemplary model in which the present invention may be employed. Many alternate controller and system environments may embody the methods and structures of the present invention as set forth in the appended claims.

DATA AND PARITY ENCODING

The present method encodes data into a matrix of blocks stored on an array of n data storage devices, where (n+1) is a prime number greater than 3. The maximum size of the data matrix to be encoded is equal to the storage capacity of (n−2) of the storage devices. Therefore, the method requires the equivalent capacity of two disks in the array 108 for storing parity information used to reconstruct the data lost on two (and in some cases, more) failed disks. A given data block, or block of symbols, is translated into a code block of $n^2$ symbols, in which 2n symbols are redundant, called parity symbols. The method is applicable to any square matrix of order n, where n+1 is any prime number greater than 3, and where the matrix elements are members of the same Abelian group G. In practice, G is the set of all binary m-tuples to which is applied a bit-wise XOR operation, where m is arbitrary. Thus, depending on the value of m, each element in the matrix may represent a bit, a byte, a disk sector, a cluster of disk sectors, or any other quantity of information. The methods of the present invention are therefore applicable regardless of the size of the blocks used in the matrix. An entire array (or an entire RAID logical unit—LUN) may be protected as though it defines a single n×n matrix or the array (or LUN) may be protected by tiling the array (or LUN) with a number of such defined matrices.

Each element $a_{r,c}$ in a matrix A of the present invention may be identified by the standard rectangular coordinates of row r=1 . . . n, and column c=1 . . . n. For the purpose of clarity in the describing the present method, each element can also be identified by diagonal coordinates, written as pre-subscripts. Thus, each element $_{u,d}a$ is defined to lie in left-to-right upward sloping (↗) diagonal numbered u, and in left-to-right downward sloping (↘) diagonal numbered d, where $$u=(r+c)\ mod\ (n+1)=0\ \ldots\ n;\ and \qquad (1)$$

$$d=(c-r)\ mod\ (n+1)=0\ \ldots\ n. \qquad (2)$$

The rectangular coordinates of an element a in the matrix A are obtained from its diagonal coordinates by the inverse transformation:

if (u+d) is even, $r=(n+1+(u-d)/2) \bmod (n+1)$, and $$c=(u+d)/2; \quad (3)$$

if (u+d) is odd, $r=((n+1+u-d)/2) \bmod (n+1)$, and $$c=((n+1+u+d)/2) \bmod (n+1) \quad (4)$$

In one exemplary embodiment of the present invention, the coordinate transformation equations (1) through (4) are implemented as lookup tables.

Each element in the matrix contains either data or parity. Data elements are independent variables which occupy every location in the matrix except the two major diagonals, where u=0 or d=0. The major diagonals are reserved for parity elements, which are dependent variables each of whose value is the XOR sum of the (n−2) data elements in the diagonal which intersects it (with wrap-around as described herein below). A sixth-order matrix is shown below, where data elements and parity elements are represented by "D" and "P", respectively. Note that parity elements (P) lie along both major diagonals and data elements D occupy all other locations in the matrix.

|   | COLUMN | | | | | |
|---|---|---|---|---|---|---|
|   | 1 | 2 | 3 | 4 | 5 | 6 |
| 1 | P | D | D | D | D | P |
| R 2 | D | P | D | D | P | D |
| O 3 | D | D | P | P | D | D |
| W 4 | D | D | P | P | D | D |
| 5 | D | P | D | D | P | D |
| 6 | P | D | D | D | D | P |

Matrix of Order 6

WRAPPED DIAGONALS

Each parity element has a value equal to the XOR sum of the (n−2) data elements in the "wrapped" diagonal which intersects the given parity element. A wrapped diagonal is the diagonal which results from wrapping the matrix in accordance with the above equations (1) through (4) defining the computation of upward diagonals (u) and downward diagonals (d). For example, the above 6×6 matrix defines the wrapped upward and downward diagonals as shown below using the pre-subscript $_{u,d}a$ notation.

|   | COLUMN | | | | | |
|---|---|---|---|---|---|---|
|   | 1 | 2 | 3 | 4 | 5 | 6 |
| 1 | $_{2,0}P$ | $_{3,1}D$ | $_{4,2}D$ | $_{5,3}D$ | $_{6,4}D$ | $_{0,5}P$ |
| R 2 | $_{3,6}D$ | $_{4,0}P$ | $_{5,1}D$ | $_{6,2}D$ | $_{0,3}P$ | $_{1,4}D$ |
| O 3 | $_{4,5}D$ | $_{5,6}D$ | $_{6,0}P$ | $_{0,1}P$ | $_{1,2}D$ | $_{2,3}D$ |
| W 4 | $_{5,4}D$ | $_{6,5}D$ | $_{0,6}P$ | $_{1,0}P$ | $_{2,1}D$ | $_{3,2}D$ |
| 5 | $_{6,3}D$ | $_{0,4}P$ | $_{1,5}D$ | $_{2,6}D$ | $_{3,0}P$ | $_{4,1}D$ |
| 6 | $_{0,2}P$ | $_{1,3}D$ | $_{2,4}D$ | $_{3,5}D$ | $_{4,6}D$ | $_{5,0}P$ |

Wrapped Diagonals Matrix

As can be seen from the 6th order wrapped diagonals matrix shown above, upward sloping and downward sloping diagonals are indicated by pre-subscripts u and d, respectively, for each element $_{u,d}a$ (both data and parity elements). As defined in equations (1) and (2), above, an element at a given row r and column c is located in upward sloping diagonal $u=(r+c) \bmod 7$ and in downward sloping diagonal $d=(c-r) \bmod 7$, for a 6th order matrix. For example, element $_{5,4}D$ is located at row 4, column 1. As a further example, the diagonal coordinates of each parity element $_{u,d}P$ can be determined by substituting the rectangular coordinates r and c, in equations (1) and (2) for the major diagonals as follows:

(r=1, c=1), (r=2, c=2) ... (r=n, c=n), for the downward diagonal d=0; and (r=n, c=1), (r=n−1, c=2) ... (r=1, c=n) for the upward diagonal u=0.

Substitution of the above values yields u and d coordinates for the parity blocks in the major diagonals of:

$_{2,0}P, {}_{4,0}P, {}_{6,0}P, {}_{1,0}P, {}_{3,0}P, {}_{5,0}P$; and $_{0,2}P, {}_{0,4}P, {}_{0,6}P, {}_{0,1}P, {}_{0,3}P, {}_{0,5}P$;

for the downward sloping (d) and upward sloping (u) major diagonals, respectively, in a 6th order matrix.

The value of a given parity element P is the XOR sum of the four data elements in its intersecting minor diagonal (with wrap-around). In the next matrix the elements in bold are the terms in the parity equation for element $_{0,4}P$, and lie in downward sloping (wrapped) diagonal d=4.

|   | COLUMN | | | | | |
|---|---|---|---|---|---|---|
|   | 1 | 2 | 3 | 4 | 5 | 6 |
| 1 | $_{2,0}P$ | $_{3,1}D$ | $_{4,2}D$ | $_{5,3}D$ | $_{6,4}\mathbf{D}$ | $_{0,5}P$ |
| R 2 | $_{3,6}D$ | $_{4,0}P$ | $_{5,1}D$ | $_{6,2}D$ | $_{0,3}P$ | $_{1,4}\mathbf{D}$ |
| O 3 | $_{4,5}D$ | $_{5,6}D$ | $_{6,0}P$ | $_{0,1}P$ | $_{1,2}D$ | $_{2,3}D$ |
| W 4 | $_{5,4}\mathbf{D}$ | $_{6,5}D$ | $_{0,6}P$ | $_{1,0}P$ | $_{2,1}D$ | $_{3,2}D$ |
| 5 | $_{6,3}D$ | $_{0,4}\mathbf{P}$ | $_{1,5}D$ | $_{2,6}D$ | $_{3,0}P$ | $_{4,1}D$ |
| 6 | $_{0,2}P$ | $_{1,3}D$ | $_{2,4}\mathbf{D}$ | $_{3,5}D$ | $_{4,6}D$ | $_{5,0}P$ |

6th Order Matrix showing Wrapped Diagonal
Corresponding to Parity Equation for $_{0,4}P$

PARITY CONSTRAINTS

In general, an nth order data/parity matrix according to the method of the present invention contains a total of 2n parity elements. These parity elements are calculated using the following sets of equations which explicitly define the diagonal parity constraints. In these equations, the symbol "⊕" represents the XOR operator, n is the order of the matrix, and P is the value of a parity element located on either the upward sloping major diagonal u, or downward sloping major diagonal d.

$$\text{For } u = 1 \ldots n, \quad _{u,0}P = \bigoplus_{d=1}^{n} {}_{u,d}a, \quad (5)$$

where $d \neq u$ and $d \neq n + 1 - u$.

$$\text{For } d = 1 \ldots n, \quad _{0,d}P = \bigoplus_{u=1}^{n} {}_{u,d}a, \quad (6)$$

where $u \neq d$ and $u \neq n + 1 - d$.

A matrix consistent with these 2n constraints is termed a "protected matrix." A protected matrix has a valuable property with respect to erasures of elements therein. If the elements in any one or two columns or rows are erased, then their unknown values can calculated from the other elements in the matrix. The present method functions in accordance with the following algorithm:

If there is a non-zero diagonal (i.e., minor diagonal where neither u nor d≠0) having exactly one erased element, then that element is recovered by calculating the XOR sum of all of the (n−2) unerased elements in that diagonal. This procedure is repeated until all erased elements in the matrix have been recovered.

The algorithm works for any single erased column or row, because each erased element is contained in an upward sloping diagonal and in a downward sloping diagonal, both of which contain (n−2) unerased elements, and either of which could be used to calculate the unknown value of the erased element. The algorithm also works for any two erased columns or two erased rows (though not one erased column and one erased row) because, initially, there will always be exactly four diagonals having exactly one erased element, and the requirement that (n+1) is a prime number ensures that the newly recovered elements will yield new diagonals for solution of remaining unknown elements, until all diagonals are utilized.

Since the method of the present invention recovers all erased elements in any one or two columns, it can recover data lost from the complete failure of any one or two disks in an array. Such an array is of type "RAID level 6" according to standard RAID taxonomy. Because the present method enables recovery from loss of all elements in any one or two rows, it can avoid data loss in the case of partial failure of all n disk drives in an array, where the failures affect the same regions of disk space in each drive. If no more than two rows in any protected matrix are erased, then all erased elements can be recovered by the same technique as above.

The present method also allows recovery, in some cases, from the partial failures of all drives where erasures occur at various locations in disk space and are scattered across all rows of a matrix.

TILING OF PROTECTED MATRICES

As noted above, the elements of the protected matrix may be of any useful size. A common size selection for RAID 6 application of the present invention would be a disk sector or a disk cluster (a group of sectors aggregated as an allocation unit in the operating system application of the storage). To protect an entire disk array (or LUN of a RAID system), the entire capacity of a drive (or at least that portion used in the particular protected LUN) could be subdivided into n blocks. Such a size allocation may be impracticably large for performing requisite XOR computations. In the preferred embodiment, the capacity of the array (or RAID LUN) is therefore tiled with protected matrices of a convenient size. The protected matrices shown below exemplify such tiling where three matrices suffice for tiling of the entire array (or LUN) storage capacity.

|   |   | COLUMN |   |   |   |   |   |
|---|---|---|---|---|---|---|---|
|   |   | 1 | 2 | 3 | 4 | 5 | 6 |
|   | 1 | $2,0P$ | $3,1D$ | $4,2D$ | $5,3D$ | $6,4D$ | $0,5P$ |
| R | 2 | $3,6D$ | $4,0P$ | $5,1D$ | $6,2D$ | $0,3P$ | $1,4D$ |
| O | 3 | $4,5D$ | $5,6D$ | $6,0P$ | $0,1P$ | $1,2D$ | $2,3D$ |
| W | 4 | $5,4D$ | $6,5D$ | $0,6P$ | $1,0P$ | $2,1D$ | $3,2D$ |
|   | 5 | $6,3D$ | $0,4P$ | $1,5D$ | $2,6D$ | $3,0P$ | $4,2D$ |
|   | 6 | $0,2P$ | $1,3D$ | $2,4D$ | $3,5D$ | $4,6D$ | $5,0P$ |
|   | 7 | $2,0P$ | $3,1D$ | $4,2D$ | $5,3D$ | $6,4D$ | $0,5P$ |
| R | 8 | $3,6D$ | $4,0P$ | $5,1D$ | $6,2D$ | $0,3P$ | $1,4D$ |
| O | 9 | $4,5D$ | $5,6D$ | $6,0P$ | $0,1P$ | $1,2D$ | $2,3D$ |
| W | 10 | $5,4D$ | $6,5D$ | $0,6P$ | $1,0P$ | $2,1D$ | $3,2D$ |
|   | 11 | $6,3D$ | $0,4P$ | $1,5D$ | $2,6D$ | $3,0P$ | $4,2D$ |
|   | 12 | $0,2P$ | $1,3D$ | $2,4D$ | $3,5D$ | $4,6D$ | $5,0P$ |
|   | 13 | $2,0P$ | $3,1D$ | $4,2D$ | $5,3D$ | $6,4D$ | $0,5P$ |
| R | 14 | $3,6D$ | $4,0P$ | $5,1D$ | $6,2D$ | $0,3P$ | $1,4D$ |
| O | 15 | $4,5D$ | $5,6D$ | $6,0P$ | $0,1P$ | $1,2D$ | $2,3D$ |
| W | 16 | $5,4D$ | $6,5D$ | $0,6P$ | $1,0P$ | $2,1D$ | $3,2D$ |
|   | 17 | $6,3D$ | $0,4P$ | $1,5D$ | $2,6D$ | $3,0P$ | $4,2D$ |
|   | 18 | $0,2P$ | $1,3D$ | $2,4D$ | $3,5D$ | $4,6D$ | $5,0P$ |

Tiled Matrices

With such tiling of protected matrices over the entire capacity of a disk array (or LUN), simple modulo and offset calculations for a given logical address in an I/O request identifies which of the tiled matrices contains the desired information and what the starting row number of that matrix will be. Further, simple offset computations determine which blocks and which rows are relevant to any error correction XOR computations and parity generation. Slightly more complex computations may be employed to vary the size of elements (i.e., to vary the block or cluster size) associated with each protected matrix. Offset computations associated with the tiling process of the present invention are thereby made slightly more complex in that the size of each matrix must be determined to identify the appropriate rows and blocks for a parity computation and to determine where the next matrix is located in the array (or LUN).

The remainder of this specification presents the methods and examples in terms of a single matrix. Those skilled in the art will readily recognize scaling of the methods to any of a plurality of tiled matrices.

ERASURE CORRECTION

If a disk drive fails catastrophically, or incurs an unrecoverable data error, the condition is typically indicated to the array controller by status codes or lack of appropriate response from the drive. In such a case, some or all of the drive's stored elements are inaccessible and are said to be "erased". In general, a drive is considered to have partially failed when some, but not all, of its elements have been erased, and it is considered to have "completely failed" when all of its elements have been erased.

RECOVERY FROM A FAILURE OF TWO DISK DRIVES IN AN ARRAY

Data stored in a protected matrix on an array of data storage devices 108 can be recovered, if subsequently erased from two of the devices, because of the advantageous properties of such a matrix. One of these properties is that if the elements in any one or two columns (or one or two rows) are erased, then their unknown values can be generated from the other remaining (unerased) elements in the matrix. A general algorithm for recovering all of the missing elements from a protected matrix is shown in FIG. 4, which is best understood when read in conjunction with the matrix tables shown below.

Figure 4:
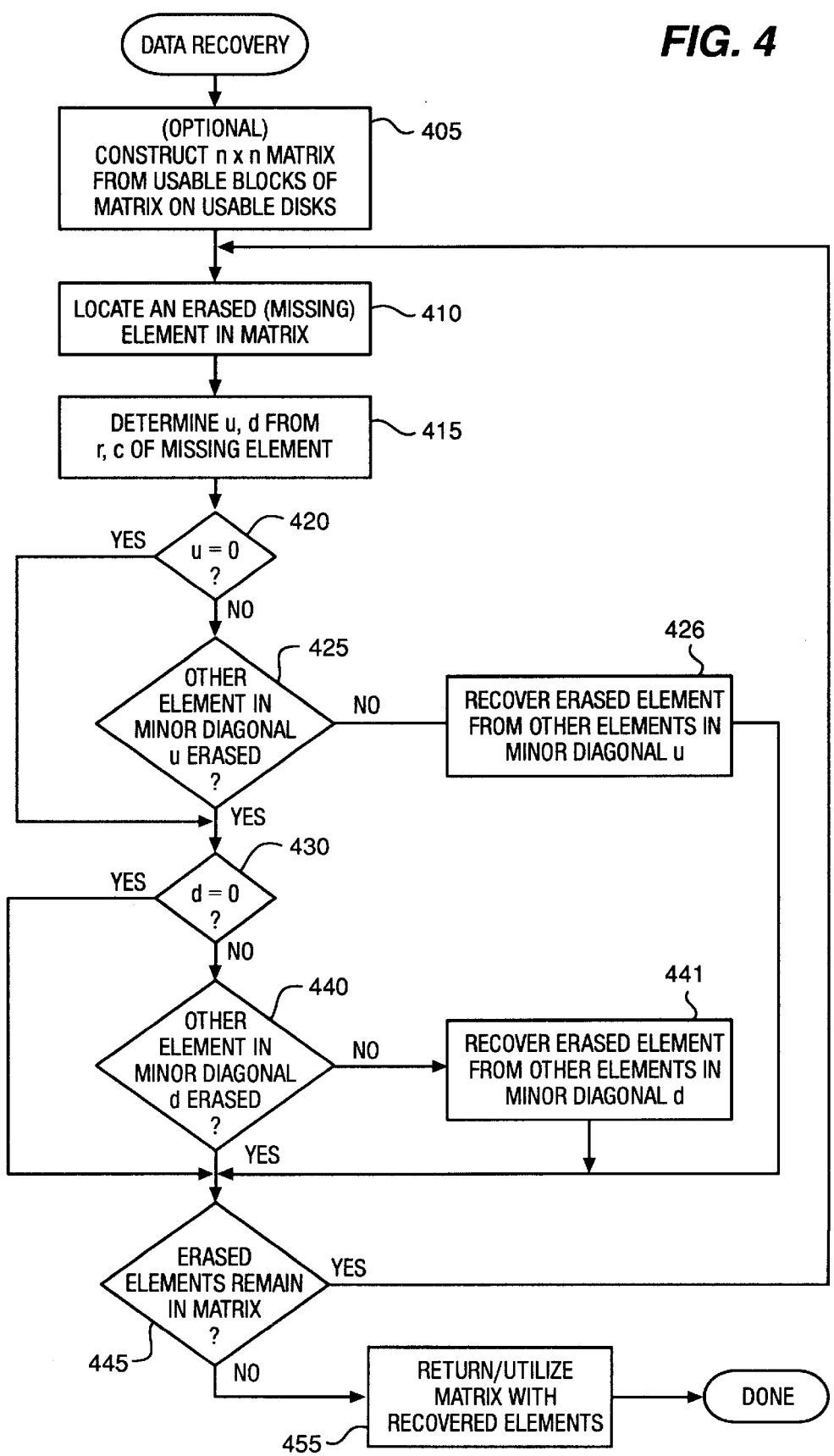
FIG. 4 is a flowchart a method of the present invention for recovering missing elements from a protected matrix.

FIG. 4 is a flowchart describing an error recovery procedure invoked when it is determined that one or more disks have failed, or that data on one or more disk drives has been erased. In such a mode of operation, often called degraded mode, data in a protected matrix is recovered by XOR parity computations using the minor diagonals which include elements in the affected (failed) disk drives. Such data reconstruction may be for either of at least two purposes. First, in degraded mode, a disk array may remain operational to process read and write requests from the attached computing system. To satisfy a read request for a disk array operating in degraded mode it is necessary to reconstruct the missing (erased) data and parity elements of the matrix lost due to failure of one or more disk drives.

Element 405 is operable to allocate a working memory buffer and to copy as much as possible of the protected matrix containing the erased (or missing) data to working memory. The memory buffer is used as a two dimensional matrix as is the protected matrix on disk so that each strip (or the appropriate segment of the strip, in a multiple-column strip) is mapped to its corresponding column in the matrix. Operation of element 405 is denoted as optional in that such a memory buffer may either be statically allocated or the reconstruction may be performed with less memory than required to store the entire matrix. For example, the manipulations described herein below may be equivalently performed by reading the available data and parity elements of the matrix from their respective disk drives as the elements are required in the XOR parity computations described herein below.

The matrix table shown below illustrates an example wherein disks 2 and 4 (corresponding to any two of disks 110(*) in FIG. 1) have completely failed (or have been totally erased or are otherwise inaccessible), thereby resulting in "vacant" columns 2 and 4 in the parity matrix. The data and parity elements originally contained in columns 2 and 4 are shown as "Erased Columns" to the right of the partially reconstructed initial matrix. Further aspects of the flowchart of FIG. 4 will refer to the table below and related tables below depicting exemplary processing of the method of FIG. 4 to recover erased elements in a protected matrix.

|   | COLUMN |   |   |   |   |   |   |   |
|---|---|---|---|---|---|---|---|---|
|   | 1 | 2 | 3 | 4 | 5 | 6 | 2 | 4 |
| R 1 | $_{2,0}P$ | ⊠ | $_{4,2}D$ | ⊠ | $_{6,4}D$ | $_{0,5}P$ | $_{3,1}D$ | $_{5,3}D$ |
| R 2 | $_{3,6}D$ | ⊠ | $_{5,1}D$ | ⊠ | $_{0,3}P$ | $_{1,4}D$ | $_{4,0}P$ | $_{6,2}D$ |
| O 3 | $_{4,5}D$ | ⊠ | $_{6,0}P$ | ⊠ | $_{1,2}D$ | $_{2,3}D$ | $_{5,6}D$ | $_{0,1}P$ |
| W 4 | $_{5,4}D$ | ⊠ | $_{0,6}P$ | ⊠ | $_{2,1}D$ | $_{3,2}D$ | $_{6,5}D$ | $_{1,0}P$ |
| 5 | $_{6,3}D$ | ⊠ | $_{1,5}D$ | ⊠ | $_{3,0}D$ | $_{4,1}D$ | $_{0,4}P$ | $_{2,6}D$ |
| 6 | $_{0,2}P$ | ⊠ | $_{2,4}D$ | ⊠ | $_{4,6}D$ | $_{5,0}P$ | $_{1,3}D$ | $_{3,5}D$ |
|   | Initial Matrix With Two Erased Columns |   |   |   |   |   | Erased Columns | |

At element 410, the first (or next as noted below) erased element in the matrix is located. This can be done by scanning the matrix in either row or column order. In the present example, the matrix is scanned in column order. Since there are no erased elements in column 1, the first erased element is found at row 1, column 2, which is represented as $a_{1,2}$ using rectangular coordinates. At element 415, element $a_{1,2}$ is determined to be located in upward sloping minor diagonal u=3, and downward sloping minor diagonal d=1. These values can be determined by substituting the rectangular coordinates r=1 and c=2 in equations (1) and (2), above, or by using a lookup table as noted above. Values of u=3 and d=0 . . . 6 are substituted for $_{u,d}a$, where d≠u and d≠n+1−u (see equation (5), above) to determine the members of minor upward diagonal u=3 which contains the erased element. Such substitutions yields elements $_{3,0}P$, $_{3,1}D$, $_{3,2}D$, $_{3,5}D$, and $_{3,6}D$ in the minor upward diagonal for u=3.

Element 420 verifies that the element located is not in the upward major diagonal u=0. If the erased element located in processing by element 410 and 415 is in the upward major diagonal, the element cannot be recovered from the upward diagonal and hence processing continues with element 430 below.

If the located element is not in the upward major diagonal, at element 425, the minor upward diagonal containing the located erased element (e.g., u=3 as in the example table above) is inspected for other erased elements. Since the exemplary element $_{3,5}D$ (which has rectangular coordinates of $a_{6,4}$) is also an erased element in the same upward minor diagonal, the minor diagonal u=3 has more than one erased element, and therefore cannot be recovered until one of the erased elements is reconstructed via a different minor diagonal. Processing therefore continues with element 430 below.

If no other erased elements are found in the upward minor diagonal by processing of element 425, this upward minor diagonal may be used to recover the erased element. Element 426 is then operable to recover the located erased element by computing the XOR parity of the remaining available elements in the upward minor diagonal containing the located erased element. Specifically, the XOR sum result of the other elements provides the data values for the erased element. The data so recovered is then written to the memory buffer representation of the matrix (or otherwise saved for further processing of the matrix as discussed herein below). Processing for recovery of this located erased element is then completed and the method continues with element 445 to locate other erased elements to be similarly recovered.

Where the element cannot be recovered by use of its upward diagonal elements, element 430 is next operable to determine if the element lies in the downward major diagonal (d=0). If so, the element cannot be recovered by processing in its downward diagonal and processing continues with element 445 below. Otherwise element 440 is next operable to determine if other erased elements are in the same downward minor diagonal as the element located by processing of element 410 and 415. If other elements in the downward minor diagonal containing the located erased element are also erased, then the located element cannot presently be recovered through use of this downward minor diagonal.

In the examples herein, element 440 determines the availability of the other member elements of minor diagonal d=1. Substituting values of u=0 . . . 6 and d=1 for $_{u,d}a$, where u≠d and u≠n+1−d (see equation (6), above) yields member elements $_{0,1}P$, $_{2,1}D$, $_{3,1}D$, $_{4,1}D$, and $_{5,1}D$. At element 440, it is determined that element $_{0,1}P$ is also erased. Therefore, minor diagonals u=3 and d=1 cannot be recovered presently (until other erased elements therein are reconstructed via other minor diagonals), and elements 445 and 410 are performed to locate the next erased element in the matrix. As noted above, an element may be unrecoverable until other elements are first recovered. An element which is currently unrecoverable due to combinations of the tests of elements 420, 425, 430 and 440 may be recoverable later after other elements have been recovered.

If no other erased elements are found in the downward minor diagonal by processing of element 440, this downward minor diagonal may be used to recover the erased element. Element 441 is then operable to recover the located erased element by computing the XOR parity of the remaining available elements in the downward minor diagonal containing the located erased element. Specifically, the XOR sum result of the other elements provides the data values for the erased element. The data so recovered is then written to the memory buffer representation of the matrix (or otherwise saved for further processing of the matrix as discussed herein below). Processing for recovery of this located erased element is then completed and the method continues with element 445 to locate other erased elements to be similarly recovered.

Element 445 is next operable to determine if erased elements still remain within the protected matrix to be recovered. Those skilled in the art will recognize a number of well known techniques to identify which elements of the matrix are available and which are erased and therefore in need of recovery. For example, element 405 when operable to construct a buffer memory copy of the matrix to be recovered can detect the number of erased elements. Each time an element is recovered by operation of elements 426 or 441, the number can be reduced until element 445 finds no erased elements left to recover. Those skilled in the art will recognize a number of equivalent techniques as a matter of design choice in implementing the invention.

If element 445 determines that no additional erased elements need be recovered, element 455 is finally operable to complete the method by returning or otherwise utilizing the recovered data. As noted above, the recovery method of FIG. 4 may be invoked for purposes of restoring erased data when a repaired or replacement disk drive is to be initialized. In such a case, element 455 is operable to write the entire recovered matrix elements to the replacement/repaired disk drive(s) of the array for persistent storage. If on the other hand the recovery method of FIG. 4 is invoked for reading data in a degraded operating mode, element 455 is operable to return the requested data with any recovered elements as determined by operation of the method.

If element 445 determines that additional erased elements remain to be recovered, processing continues by looping back element 410. As noted above, a located erased element may be presently unrecoverable until other elements are first recovered. Elements 445 and 410 are therefore operable in combination to proceed past such a presently unrecoverable element to locate and attempt recovery of other elements. When a first "pass" is completing to attempt recovery of all erased elements in the matrix, a second pass is then initiated to retry recovery of any elements not presently recoverable in the first pass. Other steps (not shown) of the methods of the present invention may be employed to assure eventual completion of the method of FIG. 4. For example, if three disk drives were to fail, the disk array would become unusable and the method of FIG. 4 could never complete recovery of erased elements of protected matrices. As would be the case with other RAID levels, other methods may be employed to recover erased data in such situations. Such considerations are well known matters of design choice in implementing the present invention.

Having described the flowchart of FIG. 4, this description continues iteration through the method using the above example. Further processing of the method as applied to the above example will eventually recover all erased elements in the missing two columns. The next erased element is found in column 2 at row 2, which is element $a_{2,2}$. Element 415 is then executed, in which element $a_{2,2}$ is determined to be located in upward sloping minor diagonal u=4, and downward sloping major diagonal d=0, and is therefore a parity element ($_{4,0}P$). The other member elements of minor diagonal u=4 are then identified. Since element $_{4,0}P$ is located along a major diagonal, there is only one intersecting minor diagonal, u=4, and values of equation (5) are solved to determine the members of minor diagonal u=4. Substituting values of u=4 and d=0 . . . 6 for $_{u,d}a$, where d≠u and d≠n+1−u [see equation (5)] yields member elements $_{4,0}P$, $_{4,1}D$, $_{4,2}D$, $_{4,5}D$, and $_{4,6}D$. Since four of the elements in minor diagonal u=4 are known (i.e., no other elements in that minor diagonal are erased), element 426 is operable to recover erased element $_{4,0}P$ by substituting values for the four known data elements in equation (5). The next erased element, $_{5,6}D$ is located, at element 450.

Since it is determined by the method that minor diagonals u=5 and d=6 both contain other erased elements, the method again proceeds to locate the next erased element in the matrix, element $_{6,5}D$. Likewise, minor diagonals u=6 and d=5 both contain other erased elements, so the process repeats again to find $_{0,4}P$, the next erased element in the matrix. Since element $_{0,4}P$ has no intersecting minor diagonal u because it is on a major diagonal the upward diagonal cannot be used for recovery However, since four of the elements in minor diagonal d=4 are known (i.e., not erased), erased element $_{0,4}P$ is recovered by substituting values for the four known elements in minor diagonal d=4, into equation (6).

The last erased element in column 2 is element $_{1,3}D$. Since both minor diagonals u=1 and d=3 contain additional erased elements, element $_{1,3}D$ cannot presently be recovered so the next erased element in the matrix is located.

Note that at this point, elements $_{0,4}P$ and $_{4,0}P$, have been recovered in column 2. Following a procedure similar to that performed for column 2, elements $_{6,2}D$ and $_{2,6}D$ in minor diagonals u=2 and d=2 are recovered in column 4. The four elements thus recovered are shown in boldface in the matrix table, below.

|     |   | COLUMN |   |   |   |   |
|-----|---|---|---|---|---|---|
|     |   | 1 | 2 | 3 | 4 | 5 | 6 |
|     | 1 | $_{2,0}P$ | ⊠ | $_{4,2}D$ | ⊠ | $_{6,4}D$ | $_{0,5}P$ |
| R   | 2 | $_{3,6}D$ | $_{4,0}P$ | $_{5,1}D$ | $_{6,2}D$ | $_{0,3}P$ | $_{1,4}D$ |
| O   | 3 | $_{4,5}D$ | ⊠ | $_{6,0}P$ | ⊠ | $_{1,2}D$ | $_{2,3}D$ |
| W   | 4 | $_{5,4}D$ | ⊠ | $_{0,6}P$ | ⊠ | $_{2,1}D$ | $_{3,2}D$ |
|     | 5 | $_{6,3}D$ | $_{0,4}P$ | $_{1,5}D$ | $_{2,6}D$ | $_{3,0}P$ | $_{4,1}D$ |
|     | 6 | $_{0,2}P$ | ⊠ | $_{2,4}D$ | ⊠ | $_{4,6}D$ | $_{5,0}P$ |

Matrix after recovery in $u = 2, 4$ and $d = 2, 4$

Following a procedure similar to that previously performed for columns 2 and 4, data elements $_{5,6}D$ and $_{6,5}D$ in minor diagonals u=6 and d=6 are next recovered in column 2. These additional elements are recoverable due to the fact that minor diagonals u=6 and d=6 each contain an additional element recovered from the previous procedure, thus removing the second erased element from each minor diagonal, and thereby allowing recovery of the additional elements in column 2. The six elements recovered thus far are shown in boldface in the matrix table, below.

COLUMN

|   | | 1 | 2 | 3 | 4 | 5 | 6 |
|---|---|---|---|---|---|---|---|
| | 1 | $_{2,0}P$ | ⊠ | $_{4,2}D$ | ⊠ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | ⊠ | $_{1,2}D$ | $_{2,3}D$ |
| W | 4 | $_{5,4}D$ | $_{6,5}D$ | $_{0,6}P$ | ⊠ | $_{2,1}D$ | $_{3,2}D$ |
| | 5 | $_{6,3}D$ | $_{0,4}P$ | $_{1,5}D$ | $_{2,6}D$ | $_{3,0}P$ | $_{4,1}D$ |
| | 6 | $_{0,2}P$ | ⊠ | $_{2,4}D$ | ⊠ | $_{4,6}D$ | $_{5,0}P$ |

Matrix after recovery in $u = 6$ and $d = 6$

Again following a procedure similar to that performed above, data elements $_{5,3}D$ and $_{3,5}D$ in minor diagonals u=5 and d=5 are next recovered in column 4. The eight elements recovered thus far are shown in boldface in the matrix table, below.

COLUMN

|   | | 1 | 2 | 3 | 4 | 5 | 6 |
|---|---|---|---|---|---|---|---|
| | 1 | $_{2,0}P$ | ⊠ | $_{4,2}D$ | $\mathbf{_{5,3}D}$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | ⊠ | $_{1,2}D$ | $_{2,3}D$ |
| W | 4 | $_{5,4}D$ | $_{6,5}D$ | $_{0,6}P$ | ⊠ | $_{2,1}D$ | $_{3,2}D$ |
| | 5 | $_{6,3}D$ | $_{0,4}P$ | $_{1,5}D$ | $_{2,6}D$ | $_{3,0}P$ | $_{4,1}D$ |
| | 6 | $_{0,2}P$ | ⊠ | $_{2,4}D$ | $\mathbf{_{3,5}D}$ | $_{4,6}D$ | $_{5,0}P$ |

Matrix after recovery in $u = 5$ and $d = 5$

Next, data elements $_{3,1}D$ and $_{1,3}D$ in minor diagonals u=3 and d=3 are recovered in column 2, to yield the 10 recovered elements shown in boldface in the matrix table, below.

COLUMN

|   | | 1 | 2 | 3 | 4 | 5 | 6 |
|---|---|---|---|---|---|---|---|
| | 1 | $_{2,0}P$ | $\mathbf{_{3,1}D}$ | $_{4,2}D$ | $\mathbf{_{5,3}D}$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | ⊠ | $_{1,2}D$ | $_{2,3}D$ |
| W | 4 | $_{5,4}D$ | $_{6,5}D$ | $_{0,6}P$ | ⊠ | $_{2,1}D$ | $_{3,2}D$ |
| | 5 | $_{6,3}D$ | $_{0,4}P$ | $_{1,5}D$ | $_{2,6}D$ | $_{3,0}P$ | $_{4,1}D$ |
| | 6 | $_{0,2}P$ | $\mathbf{_{1,3}D}$ | $_{2,4}D$ | $\mathbf{_{3,5}D}$ | $_{4,6}D$ | $_{5,0}P$ |

Matrix after recovery in $u = 3$ and $d = 3$

Finally, data elements $_{0,1}P$ and $_{1,0}P$ in minor diagonals d=1 and u=1 are recovered in column 4, to complete the recovery of all missing elements in the matrix. Therefore, the data lost on both disk drives has been recovered by the method of the present invention as shown in the matrix table below.

COLUMN

|   | | 1 | 2 | 3 | 4 | 5 | 6 |
|---|---|---|---|---|---|---|---|
| | 1 | $_{2,0}P$ | $_{3,1}D$ | $_{4,2}D$ | $\mathbf{_{5,3}D}$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | $\mathbf{_{0,1}P}$ | $_{1,2}D$ | $_{2,3}D$ |
| W | 4 | $_{5,4}D$ | $_{6,5}D$ | $_{0,6}P$ | $\mathbf{_{1,0}P}$ | $_{2,1}D$ | $_{3,2}D$ |
| | 5 | $_{6,3}D$ | $_{0,4}P$ | $_{1,5}D$ | $_{2,6}D$ | $_{3,0}P$ | $_{4,1}D$ |
| | 6 | $_{0,2}P$ | $_{1,3}D$ | $_{2,4}D$ | $\mathbf{_{3,5}D}$ | $_{4,6}D$ | $_{5,0}P$ |

Matrix after recovery in $u = 1$ and $d = 1$

RECOVERY FROM PARTIAL FAILURE OF ALL DISK DRIVES IN AN ARRAY

In this example, all six disk drives in an array group are assumed to have partially failed, each having lost up to one-third of capacity within the same regions of disk space. The failed (or erased) disks correspond to disks 110(1) through 110(n) in FIG. 1, where d=6. This situation might occur from correlated manufacturing defects in disk platters or from errors associated with certain read/write channels, etc. The present method allows recovery from such failures as the double row erasures shown in the matrix table below. The matrix below indicates an exemplary 6×6 matrix in which data in rows 4 and 5 is inaccessible. The missing data and parity elements originally contained in rows 4 and 5 are shown as "Erased Rows" to the right of the initial matrix.

COLUMN

|   | | 1 | 2 | 3 | 4 | 5 | 6 | | 1 | 2 | 3 | 4 | 5 | 6 |
|---|---|---|---|---|---|---|---|---|---|---|---|---|---|---|
| | 1 | $_{2,0}P$ | $_{3,1}D$ | $_{4,2}D$ | $_{5,3}D$ | $_{6,4}D$ | $_{0,5}P$ | | | | | | | |
| R | 2 | $_{3,6}D$ | $_{4,0}P$ | $_{5,1}D$ | $_{6,2}D$ | $_{0,3}P$ | $_{1,4}D$ | | | | | | | |
| O | 3 | $_{4,5}D$ | $_{5,6}D$ | $_{6,0}P$ | $_{0,1}P$ | $_{1,2}D$ | $_{2,3}D$ | | | | | | | |
| W | 4 | ⊠ | ⊠ | ⊠ | ⊠ | ⊠ | ⊠ | | $_{5,4}D$ | $_{6,5}D$ | $_{0,6}P$ | $_{1,0}P$ | $_{2,1}D$ | $_{3,2}D$ |
| | 5 | ⊠ | ⊠ | ⊠ | ⊠ | ⊠ | ⊠ | | $_{6,3}D$ | $_{0,4}P$ | $_{1,5}D$ | $_{2,6}D$ | $_{3,0}P$ | $_{4,1}D$ |
| | 6 | $_{0,2}P$ | $_{1,3}D$ | $_{2,4}D$ | $_{3,5}D$ | $_{4,6}D$ | $_{5,0}P$ | | | | | | | |

Initial Matrix Showing Two Erased Rows       Erased Rows

The recovery procedure for the present matrix, having two missing rows, is similar to the procedure previously performed (above) to recover data in a matrix having two missing columns. Data elements $_{5,4}D$, $_{6,3}D$, $_{3,2}D$, and $_{4,1}D$, in minor diagonals u=5, d=3, d=2, and u=4, respectively, are first recovered in columns 1 and 6. The four elements thus recovered are shown in boldface in the matrix table, below.

COLUMN

|   | | 1 | 2 | 3 | 4 | 5 | 6 |
|---|---|---|---|---|---|---|---|
| | 1 | $_{2,0}P$ | $_{3,1}D$ | $_{4,2}D$ | $_{5,3}D$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | $_{0,1}P$ | $_{1,2}D$ | $_{2,3}D$ |
| W | 4 | $\mathbf{_{5,4}D}$ | ⊠ | ⊠ | ⊠ | ⊠ | $\mathbf{_{3,2}D}$ |
| | 5 | $\mathbf{_{6,3}D}$ | ⊠ | ⊠ | ⊠ | ⊠ | $\mathbf{_{4,1}D}$ |
| | 6 | $_{0,2}P$ | $_{1,3}D$ | $_{2,4}D$ | $_{3,5}D$ | $_{4,6}D$ | $_{5,0}P$ |

Matrix after recovery in $u = 4, 5$ and $d = 2, 3$

Elements $_{6,5}D$, $_{6,4}P$, $_{2,1}D$, and $_{3,0}P$, in minor diagonals u=6, d=4, d=1, and u=3, respectively, are next recovered in columns 2 and 5. The eight elements recovered thus far are shown in boldface in the matrix table, below

|   | | COLUMN | | | | | |
|---|---|---|---|---|---|---|---|
|   |   | 1 | 2 | 3 | 4 | 5 | 6 |
|   | 1 | $_{2,0}P$ | $_{3,1}D$ | $_{4,2}D$ | $_{5,3}D$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | $_{0,1}P$ | $_{1,2}D$ | $_{2,3}D$ |
| W | 4 | $\mathbf{_{5,4}D}$ | $\mathbf{_{6,5}D}$ | ⊠ | ⊠ | $_{2,1}D$ | $_{3,2}D$ |
|   | 5 | $\mathbf{_{6,3}D}$ | $\mathbf{_{6,4}P}$ | ⊠ | ⊠ | $_{3,0}P$ | $_{4,1}D$ |
|   | 6 | $_{0,2}P$ | $_{1,3}D$ | $_{2,4}D$ | $_{3,5}D$ | $_{4,6}D$ | $_{5,0}P$ |

Matrix after recovery in u = 3, 6 and d = 1, 4

Data elements $_{1,5}D$ and $_{2,6}D$, in minor diagonals d=5 and u=2, respectively, are next recovered in columns 3 and 4. The 10 elements recovered thus far are shown in boldface in the matrix table, below

|   | | COLUMN | | | | | |
|---|---|---|---|---|---|---|---|
|   |   | 1 | 2 | 3 | 4 | 5 | 6 |
|   | 1 | $_{2,0}P$ | $_{3,1}D$ | $_{4,2}D$ | $_{5,3}D$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | $_{0,1}P$ | $_{1,2}D$ | $_{2,3}D$ |
| W | 4 | $\mathbf{_{5,4}D}$ | $\mathbf{_{6,5}D}$ | ⊠ | ⊠ | $_{2,1}D$ | $_{3,2}D$ |
|   | 5 | $\mathbf{_{6,3}D}$ | $\mathbf{_{6,4}P}$ | $\mathbf{_{1,5}D}$ | $\mathbf{_{2,6}D}$ | $_{3,0}P$ | $_{4,1}D$ |
|   | 6 | $_{0,2}P$ | $_{1,3}D$ | $_{2,4}D$ | $_{3,5}D$ | $_{4,6}D$ | $_{5,0}P$ |

Matrix after recovery in u = 2 and d = 5

Finally, parity elements $_{0,6}P$ and $_{1,0}P$, in minor diagonals d=6 and u=1, respectively, are recovered in columns 3 and 4. The original matrix, shown below, has been completely recovered, with all 12 restored elements shown in boldface.

|   | | COLUMN | | | | | |
|---|---|---|---|---|---|---|---|
|   |   | 1 | 2 | 3 | 4 | 5 | 6 |
|   | 1 | $_{2,0}P$ | $_{3,1}D$ | $_{4,2}D$ | $_{5,3}D$ | $_{6,4}D$ | $_{0,5}P$ |
| R | 2 | $_{3,6}D$ | $_{4,0}P$ | $_{5,1}D$ | $_{6,2}D$ | $_{0,3}P$ | $_{1,4}D$ |
| O | 3 | $_{4,5}D$ | $_{5,6}D$ | $_{6,0}P$ | $_{0,1}P$ | $_{1,2}D$ | $_{2,3}D$ |
| W | 4 | $\mathbf{_{5,4}D}$ | $\mathbf{_{6,5}D}$ | $\mathbf{_{0,6}P}$ | $\mathbf{_{1,0}P}$ | $_{2,1}D$ | $_{3,2}D$ |
|   | 5 | $\mathbf{_{6,3}D}$ | $\mathbf{_{6,4}P}$ | $\mathbf{_{1,5}D}$ | $\mathbf{_{2,6}D}$ | $_{3,0}P$ | $_{4,1}D$ |
|   | 6 | $_{0,2}P$ | $_{1,3}D$ | $_{2,4}D$ | $_{3,5}D$ | $_{4,6}D$ | $_{5,0}P$ |

Matrix after recovery in u = 1 and d = 6

RECOVERY FROM PARTIAL FAILURE OF VARIOUS DISK DRIVES IN AN ARRAY

The above description presented the techniques of the present invention which permit recovery for failures of either one or two columns in the array (corresponding to one or two disk drives in an array) as well as partial failure in one or two rows of an array (coordinated partial failures on all disk drives). An additional feature of the present invention is that the same methods may be used to recover various patterns of failures in the storage domain of all drives in the array. In particular, various uncorrelated patterns of erased elements, distributed over the columns and rows of the array, may be recovered by the methods of the present invention. Various such patterns of erased elements may be recovered so long as the total number of erased elements is less than or equal to 2n.

Unlike the failures described above, such distributed failures may not necessarily be confined to one or two columns or one or two rows. Rather, the erased elements may be distributed in various patterns over the storage domain of the array. Not all such distribution patterns may be recovered by the methods of the present invention, however, a large class of such patterns may be recovered. The same methods as presented above are applied to recover such failures. However, the methods may be unsuccessful in accomplishing the desired recovery in all cases.

Where the methods are incapable of recovering all elements, the method as described in FIG. 4 must be enhanced to monitor progress of the process to thereby avoid infinite loops in attempting to recover unrecoverable elements. In particular, the method performs a pass over all elements in the array to locate erased elements as described above. When an erased element is located, recovery is attempted by determining if an intersecting minor diagonal can be used to recover the element. If no minor diagonal presently can recover the element, the element is left for a subsequent pass over the matrix. At such later time, other elements may have been recovered to thereby permit a previously unusable minor diagonal to be used to recover the erased element. The method may be enhanced to monitor the number of erased elements recovered in each pass through the matrix. If a pass is made where no elements are recovered but erased elements remain in the matrix, then those elements cannot be recovered in the methods of the present invention. The method would therefore terminate and other traditional recovery procedures would be utilized to recover the erased elements.

LOGICAL TO PHYSICAL MAPPING

The methods and structure of the present invention generally require that the elements in a column be mapped to physical storage on the same physical disk drive. Otherwise than this constraint, the methods and apparatus of the present invention are operable regardless of the particular mapping of matrix elements to physical storage. The elements are managed and manipulated in accordance with the diagonal structures and methods presented herein largely regardless of the physical storage location. The matrix structure and associated methods therefore encode and utilize redundancy information using logical addressing of matrix elements as presented herein (i.e., u and d diagonal coordinates). Those skilled in the art will therefore recognize a wide variety of logical to physical location mapping which may be employed in conjunction with the present invention. Certain of such mapping may provide improved performance in certain corresponding classes of applications.

LARGE WRITES

If all of the data elements of a matrix are updated at the same time (termed a "large write", "group write", or "consolidated write"), then all 2n parity elements must be updated so as to maintain a protected matrix. In such a case, equations (5) and (6), above, can be used directly to determine all of the new parity values. A large write thus requires 2n(n−3) XOR operations and the writing of all $n^2$ elements of the matrix to the protected matrix persistent storage on the disk drives. Since each column of elements is normally written as a contiguous strip (i.e., written in a single I/O operation on a single disk drive), the entire large write will involve a total of n I/O operations.

Large write operations are used to initially populate such a disk array (or LUN) in accordance with the methods of the present invention. If initial data is to be copied to such a LUN or array operable in accordance with the present invention, a sequence of large write operations, one for each protected matrix populating the capacity of the LUN or array, is performed to rapidly create the data on the initialized storage area. Of course, since the methods of the present invention utilize XOR parity computations exclusively, a blank initialized LUN is simply initialized by zeroing all data on the LUN. Those skilled in the art will also recognize other mapping techniques known in the art wherein uninitialized portions need only be written the first time they are used to store data.

Figure 2:
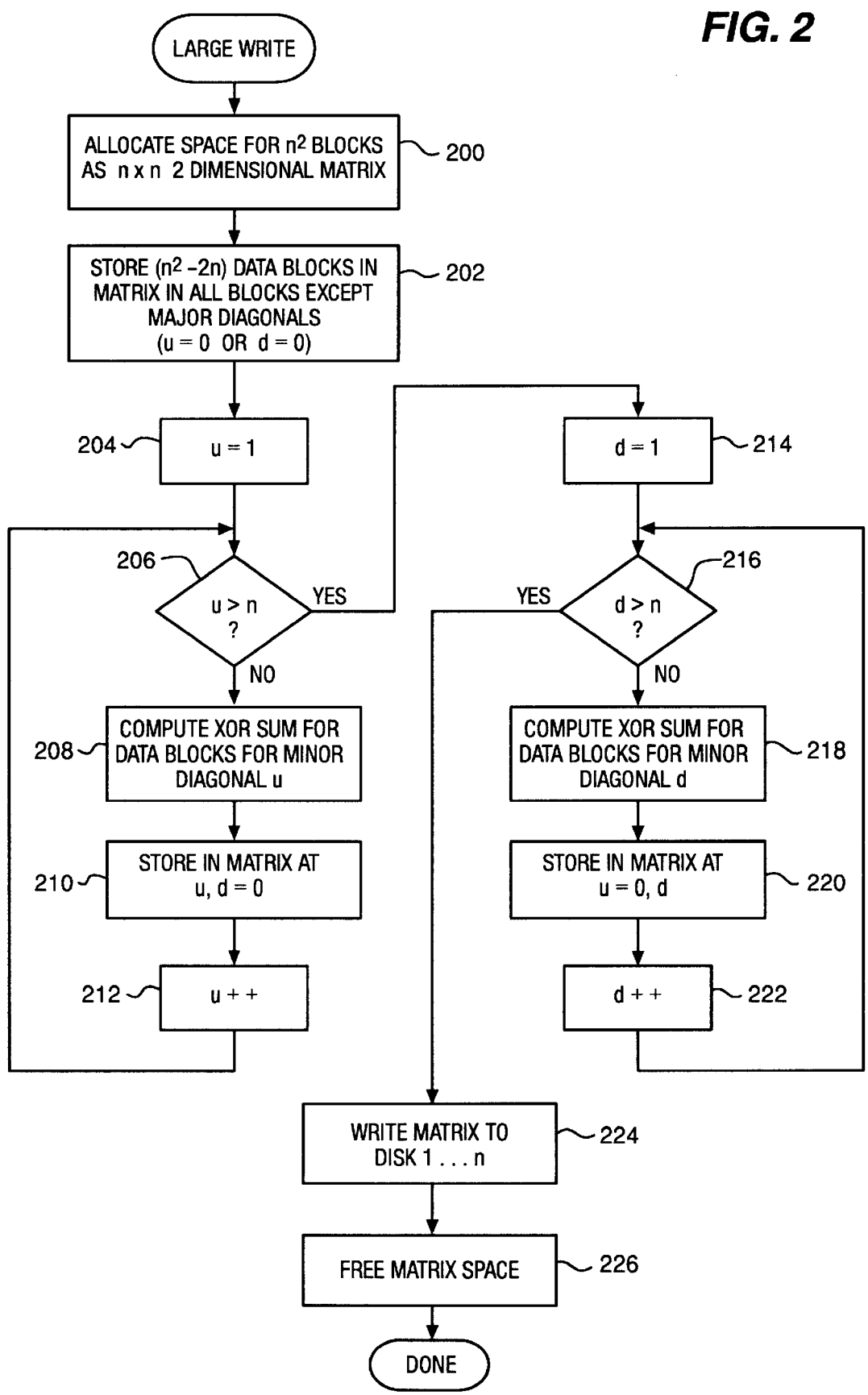
FIG. 2 is a flowchart describing a method of the present invention operable to perform a large write operation by encoding the data and parity blocks in a protected matrix in accordance with the present invention.

FIG. 2 is a flowchart describing the operation of a large write operation to construct requisite parity blocks in accordance with the present invention. As noted above, a large write operation is used when all data blocks, and hence all parity blocks, of a protected matrix are to be updated. Well known techniques may be applied to determine when a large write may be more efficient than another style of write operation (i.e. multiple small write operations as described herein below). The total number of I/O operations required for a large write of an entire protected matrix, as noted above is n. If less than all blocks are to be written, some read I/O operations may be required to retrieve the present values of a number of the blocks in the protected matrix.

Element 200 of FIG. 2 is first operable to dynamically allocate a memory buffer for storage of $n^2$ blocks organized as a n×n two dimensional matrix. Those skilled in the art will recognize that a statically allocated buffer may also be utilized. Such design choices are well known to those skilled in the art.

Element 202 is next operable to store the $(n^2-2n)$ data blocks of the large write in the allocated matrix. The data blocks are stored in all elements of the matrix except those of the major diagonals (i.e., those corresponding to u=0 and d=0). As noted above, the specific mapping of the data into physical locations in the allocated matrix space, and hence into the protected matrix as stored in the disk array, is a matter of design choice well known to those skilled in the art.

Elements 204–212 are then operable as a loop to compute the parity blocks corresponding to the upward, minor diagonals in the matrix and store each such computed parity block in its proper position in the upward major diagonal. In particular, element 204 is operable to initialize a loop counter u to 1. Element 206 next determines if all minor upward diagonals (u=1 . . . n) have been processed as indicated when u exceeds n. If all minor upward diagonals have been processed, processing continues at element 214. Otherwise, element 208 is next operable to compute the parity block for the minor diagonal u as the XOR sum of the data blocks in the minor diagonal u. Element 210 then stores the computed parity value in its proper position in the allocated matrix at u,d=0. Element 212 is then operable to increment loop counter u. Processing then continues by looping back to element 206 until all minor diagonals have been so processed as determined by element 206.

Element 214 is then operable to initialize a loop counter d to 1. Element 216 next determines if all minor downward diagonals (d=1 . . . n) have been processed as indicated when d exceeds n. If all minor downward diagonals have been processed, processing continues at element 224. Otherwise, element 218 is next operable to compute the parity block for the minor diagonal d as the XOR sum of the data blocks in the minor diagonal d. Element 220 then stores the computed parity value in its proper position in the allocated matrix at u=0,d. Element 222 is then operable to increment loop counter d. Processing then continues by looping back to element 216 until all minor diagonals have been so processed as determined by element 216.

Element 224 is then operable to write the allocated matrix to disks for persistent storage. Lastly, element 226 is operable to free the dynamically allocated buffer space for the protected matrix. As above, such a matrix buffer may be statically allocated and assigned as a well known matter of design choice in the implementation of the present invention.

SMALL WRITES

If only one data element $a_{r,c}=_{u,d}a$ of a protected matrix is updated at a particular time (termed a "small write"), then only two parity elements need to be updated, namely the parity element $_{u,0}a$ in the data element's upward sloping diagonal $u=(r+c)$ mod $(n+1)$, and the parity element $_{0,d}a$ in the data element's downward sloping diagonal $d=(c-r)$ mod $(n+1)$.

The two parity elements can be updated efficiently by the "read-modify-write" method:

$_{u,0}a=(_{u,d}a \oplus _{u,d}a') \oplus _{u,0}a'$ $_{0,d}a=(_{u,d}a \oplus _{u,d}a') \oplus _{0,d}a'$ where the prime (') indicates the previous value of the element. Note that the sum in parenthesis is reused in the second equation, and therefore needs to be calculated only once. This approach requires only three XOR operations and involves the reading and writing of one data element and two parity elements (a total of six I/O operations). For n>4, the read-modify-write approach is more efficient than using the appropriate equations (5) and (6) above, which requires 2(n−3) XOR operations and involves reading 2(n−3) data elements and writing the two data and two parity elements (a total of 2(n−1) I/O operations).

Figure 3:
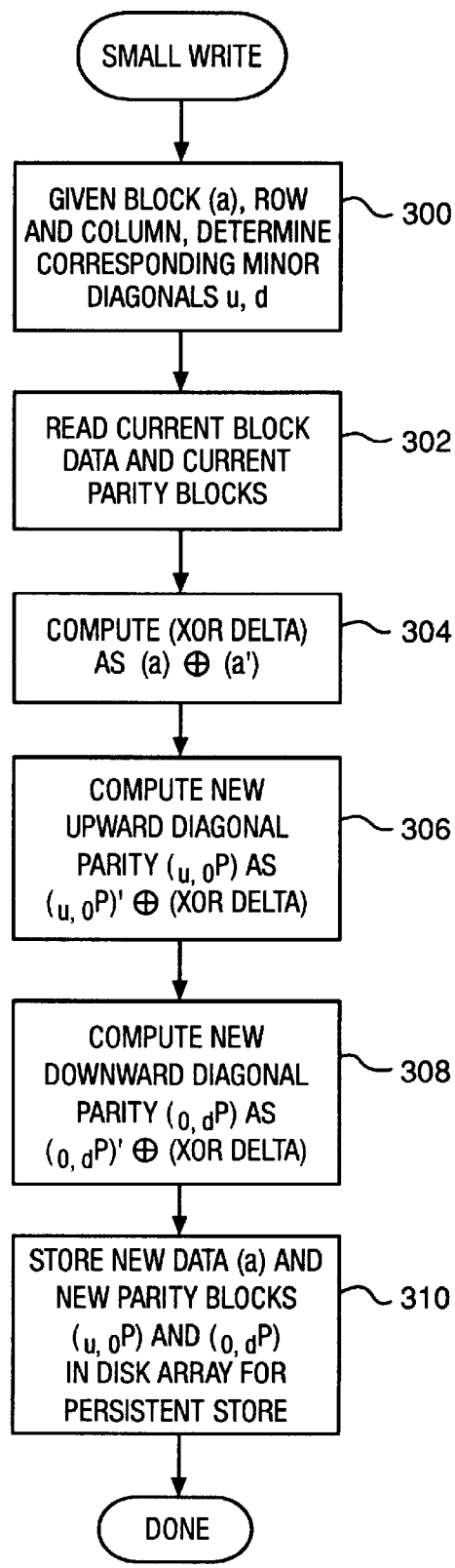
FIG. 3 is a flowchart describing a method of the present invention operable to perform a small write operation by a read-modify-write style operation on a data and parity block protected matrix encoded in accordance with the present invention.

FIG. 3 is a flowchart describing the small write operations of the present invention. The method is described for a small write request to update a single block $a_{r,c}$ given the new block data "a" and the desired location specified as row r and column c. As noted above, the method essentially performs a read-modify-write operation including the update of two parity blocks corresponding to the upward and downward minor diagonals in which the affected block (to be updated) is a member.

FIG. 3 describes the read-modify-write operation of the present invention operable to modify a single data element in a protected matrix (and the two associated parity elements). Clearly a small write operation (read-modify-write) can be used to update more than a single element in a protected matrix. Where multiple elements to be updated lie within a common minor diagonal, some savings may be realized in the operations as compared to two data elements in completely distinct minor diagonals. As noted, above, the methods and structures of the present invention are operable largely independent of the logical to physical mapping of elements within the protected matrix onto physical storage devices. Those skilled in the art will recognize a number of design choices pertaining to logical to physical storage mapping that may be made by an engineer to optimize storage for particular applications.

In particular with respect to FIG. 3, element 300 is first operable to determine, as above, the diagonal coordinates u,d of the block to be updated given the logical address row and column r,c of the block a. As noted above, such translation may be by computational means in accordance with the equations provided herein above or may be by table lookup means. Element 302 is next operable to read the present stored data contained in the affected block and the two parity blocks in the affected upward and downward minor diagonals. The old data is read into a local buffer referred to in FIG. 3 as a'. The old upward parity block is referred to as $_{u,0}P'$ and the old downward parity block is referred to as $_{0,d}P'$. Element 304 then computes an intermediate XOR value to be used in elements 306 and 308. Namely, element 304 computes an XOR value from the old data block values (a) and the new updated values (a). This intermediate value is referred to in FIG. 3 as the XOR delta.

Element 306 is then operable to compute the new upward minor diagonal parity block $_{u,0}P$ as the XOR of the old upward parity and the XOR delta. Element 308 is then operable to compute the new downward minor diagonal parity block $_{0,d}P$ as the XOR of the old downward parity and the XOR delta. Lastly, element 310 is operable to write the new data and the new upward and downward parity blocks to the disk array for persistent storage.

WRITING A MATRIX ON A DEGRADED MODE SYSTEM

When a disk array subsystem is operating with one (or more) failed drives, it is often referred to as operating in degraded mode. The redundancy of the array management techniques, such as that described herein, allows the disk array to continue operation despite the failed drive(s). As noted above, a read from disk array in degraded mode may be satisfied by reconstructing the missing (erased) data using the matrix methods and structures of the present invention.

When a disk array is operating in degraded mode, a write operation may also be simply performed in a manner analogous to the large write method described above. In particular, the protected matrix which contains the data to be updated by the write may be reconstructed in a memory buffer to recover any missing (erased) data or parity elements lost due to the failure of one or more drives. The data to be written is updated in the reconstructed matrix buffer and the associated parity elements in the matrix are updated. The updated matrix buffer is then written back to the remaining available drives which physically store the matrix. Those skilled in the art will recognize a variety of equivalent methods for operating a degraded mode disk array having data and parity stored in accordance with the present invention.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for encoding a data block onto an array of n data storage devices, where (n+1) is a prime number, and wherein said data block has a maximum size equal to the storage capacity of (n−2) of the data storage devices, said method comprising the steps of:

(a) creating a matrix of dimensions (n×n);

(b) storing ($n^2-2n$) segments of said data block as data elements in said matrix, wherein said segments are stored in a configuration in which every location in said matrix, except those locations along each major diagonal thereof, contains one of said data elements;

(c) calculating an XOR sum of all said data elements in a first wrapped minor diagonal of said matrix to produce a parity element which is stored in the major diagonal intersecting said wrapped minor diagonal;

(d) repeating step (c) for all remaining said wrapped minor diagonals; and (e) writing each column in said matrix to a counterpart one of said data storage devices.

2. The method of claim 1, wherein said matrix is recovered after having been partially erased, said method comprising the further steps of:

(f) locating an erased element in said matrix;

(g) determining all members of the wrapped minor diagonal(s) which intersect(s) the erased element;

(h) determining whether either of the members of said wrapped minor diagonal(s) contain any additional said erased elements;

(i) if no other erased elements are found for at least one minor diagonal in step (h), then recovering the erased element by performing steps (j), (k) and (m);

(j) calculating an XOR sum of all of the (n−2) unerased elements in said at least one minor diagonal having no other erased elements;

(k) storing the sum calculated in step (j) into the location in said matrix containing said erased element;

(l) If no said minor diagonal in step (h) has only one said erased element, then, locating a next erased said element in said matrix;

(m) performing steps (f) through (l) until all erased elements have been recovered; and (n) writing each column in said matrix to a counterpart one of said data storage devices.

3. A method for encoding a data block onto an array of n data storage devices, where (n+1) is a prime number, and wherein said data block has a maximum size equal to the storage capacity of (n−2) of the storage devices, said method comprising the steps of:

(a) creating a matrix of dimensions (n×n);

(b) storing ($n^2-2n$) segments of said data block as data elements in said matrix, wherein said segments are stored in a configuration in which every location in said matrix, except those locations along each major diagonal thereof, contains one of said data elements;

(c) calculating an XOR sum of all said data elements in a first wrapped minor diagonal of said matrix to produce a parity element which is stored in the major diagonal intersecting said wrapped minor diagonal;

(d) repeating step (c) for all remaining said wrapped minor diagonals;

wherein the diagonal coordinates of an element $_{u,d}a$ in said matrix are determined by the equations $$u=(r+c) \bmod (n+1); \text{ and} \qquad (i)$$

$$d=(c-r) \bmod (n+1); \qquad (ii)$$

where r and c are the rectangular coordinates of an element $a_{r,c}$ within the matrix, and element $_{u,d}a$ lies at the intersection of upward minor diagonal u and downward minor diagonal d;

wherein the diagonal coordinates of each parity element $_{u,d}P$ are determined in steps (b) and (c) by substituting values of (r=1, c=1), (r=2, c=2) . . . (r=n, c=n), and
(r=n, c=1), (r=n−1, c=2) . . . (r=1, c=n) for r and c
in equations (i) and (ii);

wherein the data elements in each said wrapped minor diagonal are determined by selecting, for each parity element $_{u,0}P$ (u=1 . . . n):

all data elements $_{u,d}D$ (d=1 . . . n, d≠u and d≠n+1−u), and for each parity element $_{0,d}P$ (d=1 . . . n):

all data elements $_{u,d}D$ (u=1 . . . n, u≠d and u≠n+1−d.);

thereby filling each location in both of the major diagonals of said matrix with one of said parity elements; and (e) writing each column in said matrix to a counterpart one of said data storage devices.

4. A method for encoding and recovering a block of data with redundancy information comprising the steps of:

dividing the block of data into $(n^2-2n)$ data elements where n+1 is a prime number;

calculating 2n parity elements each corresponding to an associated set of n−2 elements of said data elements such that each of said data elements is associated with two of said parity elements.

5. The method of claim 4 wherein said data elements and said parity elements are mapped to an n×n matrix of elements wherein n elements of said parity elements are mapped to the upward major diagonal of said matrix and wherein the remaining n elements of said parity elements are mapped to the downward major diagonal of said matrix.

6. The method of claim 5 wherein each element of said matrix is identified by rectangular coordinates r=(1 . . . n) and c=(1 . . . n), and wherein each element of said matrix is said to lie in an identified one, u, of a plurality of upward minor diagonals such that:

$u=(r+c) \bmod (n+1)$, and wherein each element of said matrix is said to lie in an identified one, d, of a plurality of downward minor diagonals such that:

$d=(c-r) \bmod (n+1)$.

7. The method of claim 6 wherein each parity element in said upward major diagonal is calculated as the XOR sum of the data elements in a corresponding downward minor diagonal; and wherein each parity element in said downward major diagonal is calculated as the XOR sum of the data elements in a corresponding upward minor diagonal.

8. The method of claim 7 wherein said corresponding downward minor diagonal comprises n−2 data elements having identical values of d associated therewith; and wherein said corresponding upward minor diagonal comprises n−2 data elements having identical values of u associated therewith.

9. The method of claim 8 further comprising the step of:

recovering erased ones of said elements using said plurality of upward minor diagonals and using said plurality of downward minor diagonals.

10. The method of claim 9 wherein the step of recovering further comprises the steps of:

locating an erased element in said matrix;

identifying a first minor diagonal containing said erased element;

determining that no other elements in said first minor diagonal are erased;

recovering said erased element using elements in said first minor diagonal in response to the determination that said first minor diagonal has no other erased elements;

identifying a second minor diagonal containing said erased element in response to a determination that said first minor diagonal has other erased elements;

determining that no other elements in said second minor diagonal are erased in response to a determination that said first minor diagonal has other erased elements;

recovering said erased element using elements in said second minor diagonal in response to the determination that said first minor diagonal has other erased elements and that said second minor diagonal has no other erased elements.

11. The method of claim 10 further comprising the step of:

repeating the step of recovering erased ones until no erased elements remain in said matrix.

12. The method of claim 5 further comprising the step of:

writing said matrix to a plurality of storage devices in an array storage subsystem having n storage devices and wherein each column of elements of said matrix is written to a corresponding one of said plurality of storage devices.

13. The method of claim 12 further comprising the step of:

recovering erased elements stored on a failed storage device of said plurality of storage devices.

14. The method of claim 12 further comprising the step of:

recovering erased elements stored on two failed storage devices of said plurality of storage devices.

15. The method of claim 12 further comprising the step of:

recovering erased elements stored on a row of said matrix corresponding to a correlated failed portion on each of said plurality of storage devices.

16. The method of claim 12 further comprising the step of:

recovering erased elements stored on two rows of said matrix corresponding to correlated failed portions on each of said plurality of storage devices.

17. The method of claim 12 further comprising the step of:

recovering erased elements corresponding to uncorrelated failed portions on a subset of said plurality of storage devices where said erased elements are not confined to one or two rows or one or two columns of said matrix.

18. An apparatus for storing data in an array storage system having n storage devices where (n+1) is a prime number, said apparatus comprising:

a matrix of dimension n×n data elements wherein said matrix comprises:

$(n^2-2n)$ data elements; and 2n parity elements each corresponding to an associated set of n−2 elements of said data elements such that each of said data elements is associated with two of said parity elements; and means for storing said matrix on said storage devices such that each column of said matrix is written to a corresponding one of said storage devices.

19. The apparatus of claim 18 wherein n elements of said parity elements are mapped to the upward major diagonal of said matrix and wherein the remaining n elements of said parity elements are mapped to the downward major diagonal of said matrix, and wherein each element of said matrix is identified by rectangular coordinates r=(1 . . . n) and c=(1 . . . n), wherein each element of said matrix is said to lie in an identified one, u, of a plurality of upward minor diagonals such that:

$$u=(r+c) \bmod (n+1), \text{ and}$$

wherein each element of said matrix is said to lie in an identified one, d, of a plurality of downward minor diagonals such that:

$$d=(c-r) \bmod (n+1),$$

said apparatus further comprising:

means for calculating each parity element in said upward major diagonal as the XOR sum of the data elements in a corresponding downward minor diagonal; and means for calculating each parity element in said downward major diagonal as the XOR sum of the data elements in a corresponding upward minor diagonal.

20. The apparatus of claim 19 further comprising:

recovering erased elements stored on a failed storage device of said plurality of storage devices.

21. The apparatus of claim 19 further comprising:

means for recovering erased elements stored on two failed storage devices of said plurality of storage devices.

22. The apparatus of claim 19 further comprising:

means for recovering erased elements stored on a row of said matrix corresponding to a correlated failed portion on each of said plurality of storage devices.

23. The apparatus of claim 19 further comprising:

means for recovering erased elements stored on two rows of said matrix corresponding to correlated failed portions on each of said plurality of storage devices.

24. The apparatus of claim 19 further comprising:

means for recovering erased elements corresponding to uncorrelated failed portions on a subset of said plurality of storage devices where said erased elements are not confined to one or two rows or one or two columns of said matrix.

25. The apparatus of claim 19 further comprising:

means for recovering erased ones of said elements using said plurality of upward minor diagonals and using said plurality of downward minor diagonals.

26. The apparatus of claim 25 wherein the means for recovering further comprises:

means for locating an erased element in said matrix;

means for identifying a first minor diagonal containing said erased element;

means for determining that no other elements in said first minor diagonal are erased;

means for recovering said erased element using elements in said first minor diagonal in response to the determination that said first minor diagonal has no other erased elements;

means for identifying a second minor diagonal containing said erased element in response to a determination that said first minor diagonal has other erased elements;

means for determining that no other elements in said second minor diagonal are erased in response to a determination that said first minor diagonal has other erased elements;

means for recovering said erased element using elements in said second minor diagonal in response to the determination that said first minor diagonal has other erased elements and that said second minor diagonal has no other erased elements.

27. The apparatus of claim 26 further comprising:

means for repeating the recovery of erased ones until no erased elements remain in said matrix.

28. An apparatus for storing data and redundancy information, comprising:

a plurality of storage devices; and an n×n matrix stored on said storage devices, wherein said matrix includes $n^2$ blocks, said $n^2$ blocks include $n^2-2n$ data blocks and 2n parity blocks, said parity blocks include n parity blocks along an upward major diagonal of said matrix and n parity blocks along a downward major diagonal of said matrix, said data blocks are along minor diagonals of said matrix, each of said data blocks are along two of said minor diagonals, each of said minor diagonals contains n−2 of said data blocks, and each of said minor diagonals is associated with one of said parity blocks.

29. The apparatus of claim 28 wherein each of said parity blocks is calculated as an XOR sum of n−2 of said data blocks along one of said minor diagonals.

30. The apparatus of claim 28 wherein n+1 is a prime number greater than 3.

31. The apparatus of claim 28 wherein each of said storage devices correspond to one column in said matrix.

32. The apparatus of claim 28 wherein said storage devices are managed in accordance with RAID level 6.

33. The apparatus of claim 28 wherein updating any one of said data blocks requires updating at most only two of said parity blocks.

34. The apparatus of claim 28 wherein a large write operation that updates each of said data blocks calculates said parity blocks with 2n(n−3) XOR calculations.

35. The apparatus of claim 28 wherein said minor diagonals include upward minor diagonals and downward minor diagonals, each of said parity blocks along said upward major diagonal is calculated as an XOR sum of n−2 of said data blocks along one of said downward minor diagonals, and each of said parity blocks along said downward major diagonal is calculated as an XOR sum of n−2 of said data blocks along one of said upward minor diagonals.

36. The apparatus of claim 35 wherein said storage devices consist of n of said storage devices, each of said storage devices corresponds to one column in said matrix, and n+1 is a prime number greater than 3.

37. The apparatus of claim 36 wherein said storage devices are disk drives managed in accordance with RAID level 6.

* * * * *